US008575791B2

(12) United States Patent
Jywe et al.

(10) Patent No.: US 8,575,791 B2
(45) Date of Patent: Nov. 5, 2013

(54) MANUFACTURING-PROCESS EQUIPMENT

(75) Inventors: Wen-Yuh Jywe, Huwei Chen (TW);
Jing-Chung Shen, Huwei Chen (TW);
Chin-Tien Yang, Huwei Chen (TW);
Chien-Hung Liu, Huwei Chen (TW);
Jau-Jiu Ju, Huwei Chen (TW);
Chia-Hung Wu, Huwei Chen (TW);
Chun-Chieh Huang, Huwei Chen (TW); Lili Duan, Huwei Chen (TW);
Yuan-Chin Lee, Huwei Chen (TW)

(73) Assignee: National Formosa University, Huwei Chen, Yunlin Hsien (TW)

( * ) Notice: Subject to any disclaimer, the term of this patent is extended or adjusted under 35 U.S.C. 154(b) by 374 days.

(21) Appl. No.: 12/971,466

(22) Filed: Dec. 17, 2010

(65) Prior Publication Data
US 2012/0156320 A1    Jun. 21, 2012

(51) Int. Cl.
*G01B 11/02* (2006.01)
*H02K 41/02* (2006.01)

(52) U.S. Cl.
USPC .......... 310/12.04; 108/20; 108/138; 108/143; 310/12.05; 355/53; 355/72; 425/150

(58) Field of Classification Search
USPC ............. 425/150, 174.4, 375; 355/53, 67, 72; 264/482, 497; 269/55, 58, 71, 73; 108/20, 140, 138, 143; 310/12.04, 310/12.05
See application file for complete search history.

(56) References Cited

U.S. PATENT DOCUMENTS

| | | | | |
|---|---|---|---|---|
| 4,760,265 A * | 7/1988 | Yoshida et al. | ............ | 250/492.2 |
| 4,812,725 A * | 3/1989 | Chitayat | ....................... | 318/625 |
| 5,121,329 A * | 6/1992 | Crump | ........................... | 700/119 |
| 5,122,660 A * | 6/1992 | Yoshii et al. | .............. | 250/237 G |
| 5,140,242 A * | 8/1992 | Doran et al. | .................. | 318/640 |
| 5,623,853 A * | 4/1997 | Novak et al. | ................. | 74/490.09 |
| 5,699,621 A * | 12/1997 | Trumper et al. | ............... | 33/1 M |
| 5,708,505 A * | 1/1998 | Sogard et al. | ................. | 356/500 |
| 5,920,974 A * | 7/1999 | Bullen | .......................... | 29/33 K |
| 6,008,500 A * | 12/1999 | Lee | ................................ | 250/548 |
| 6,331,885 B1 * | 12/2001 | Nishi | ............................... | 355/53 |
| 6,353,271 B1 * | 3/2002 | Williams | .................... | 310/12.06 |
| 6,381,002 B1 * | 4/2002 | Suzuki | ........................... | 355/53 |
| 6,606,146 B2 * | 8/2003 | Saiki | .............................. | 355/72 |
| 6,715,426 B1 * | 4/2004 | Rajaraman | .................... | 104/290 |
| 6,750,625 B2 * | 6/2004 | Binnard et al. | ............... | 318/592 |
| 6,816,232 B2 * | 11/2004 | Takahashi et al. | ............. | 355/53 |
| 6,841,965 B2 * | 1/2005 | Lee | ................................ | 318/649 |
| 6,927,840 B2 * | 8/2005 | Lee | ................................ | 355/72 |
| 7,110,086 B2 * | 9/2006 | Loopstra et al. | ............... | 355/53 |

(Continued)

*Primary Examiner* — Yogendra Gupta
*Assistant Examiner* — Emmanuel S Luk
(74) *Attorney, Agent, or Firm* — C. G. Mersereau; Nikolai & Mersereau, P.A.

(57) ABSTRACT

A manufacturing-process equipment has a platform assembly, a measurement feedback assembly and a laser-working assembly. The platform assembly has a base and a hybrid-moving platform. The base has a mounting frame. The hybrid-moving platform is mounted on the base and has a long-stroke moving stage and a piezo-driven micro-stage. The long-stroke moving stage has a benchmark set and a driving device. The piezo-driven micro-stage is connected to the long-stroke moving stage and has a working platform. The measurement feedback assembly is securely mounted on the platform assembly and has a laser interferometer, a reflecting device and a signal-receiving device. The laser-working assembly is mounted on the platform assembly, is electrically connected to the measurement feedback assembly and has a laser direct-writing head, a controlling interface device and a positioning interface device.

6 Claims, 6 Drawing Sheets

(56) References Cited

U.S. PATENT DOCUMENTS

| | | | |
|---|---|---|---|
| 7,159,307 B2 * | 1/2007 | Isogai et al. | 29/740 |
| 7,288,859 B2 * | 10/2007 | Hazelton | 310/12.04 |
| 7,566,214 B2 * | 7/2009 | Koike et al. | 425/150 |
| 7,728,462 B2 * | 6/2010 | Williams et al. | 310/12.14 |
| 7,773,234 B2 * | 8/2010 | Jywe et al. | 356/614 |
| 7,812,964 B2 * | 10/2010 | Hill | 356/500 |
| 7,965,387 B2 * | 6/2011 | Hagiwara | 356/237.5 |
| 8,147,910 B2 * | 4/2012 | Kritchman | 427/258 |
| 8,153,183 B2 * | 4/2012 | Skubic et al. | 427/8 |
| 8,267,388 B2 * | 9/2012 | Xu | 269/60 |
| 8,325,326 B2 * | 12/2012 | Shibazaki | 355/72 |
| 2005/0040712 A1 * | 2/2005 | Hazelton | 310/12 |
| 2005/0057122 A1 * | 3/2005 | Heilig et al. | 310/328 |
| 2005/0211163 A1 * | 9/2005 | Li et al. | 118/308 |
| 2005/0264148 A1 * | 12/2005 | Maldonado et al. | 313/103 R |
| 2010/0060906 A1 * | 3/2010 | Jywe et al. | 356/614 |
| 2010/0116161 A1 * | 5/2010 | Shilpiekandula et al. | 101/407.1 |
| 2012/0046779 A1 * | 2/2012 | Pax et al. | 700/112 |

* cited by examiner

MANUFACTURING-PROCESS EQUIPMENT

BACKGROUND OF THE INVENTION

1. Field of the Invention

The present invention relates to a manufacturing-process equipment for a workpieces, and more particularly to a manufacturing-process equipment that can be used to form nanometer structure pattern accurately and quickly on the workpieces.

2. Description of the Prior Arts

In general, conventional lithography technologies that used to form nanometer structure pattern or nanometer holes on a workpieces include photolithography process, electron beam lithography technology, laser interference lithography technology and laser exposure lithography technology.

However, the working speed of the above-mentioned conventional lithography technologies is slow and the equipment or equipments for the conventional lithography technologies are expensive. Additionally, the design of the platform, the precision of the position of the platform, the optical positioning system and the temperature control will influence the working accuracy of the conventional lithography technologies.

Furthermore, a location platform of the conventional laser exposure lithography technology is used to carry a workpieces and includes a long-stroke moving stage and a multi-axle short-travel moving platform. The long-stroke moving stage of the conventional location platform uses a servomotor with a ball screw, a linear motor or a voice coil motor as a driving source and uses the optics ruler and the optics read head to detect the position of the long-stroke moving stage. When the length of the optics ruler is longer than 1 meter, the working error will increase and this will influence the detecting result. Therefore, the precision of the conventional long-stroke moving stage cannot reach the nanometer level. The conventional multi-axle short-travel moving platform usually has a flexible structure made of piezoelectric material. The movement of the conventional multi-axle short-travel moving platform is about hundred micrometers, and this cannot form a large range of nanometer structure pattern or nanometer holes in the workpieces.

To overcome the shortcomings, the present invention provides a manufacturing-process equipment to mitigate or obviate the aforementioned problems.

SUMMARY OF THE INVENTION

The main objective of the present invention is to provide a manufacturing-process equipment, and more particularly to a manufacturing-process equipment that can be used to form nanometer structure pattern accurately and quickly on the workpieces.

The manufacturing-process equipment in accordance with the present invention has a platform assembly, a measurement feedback assembly and a laser-working assembly. The platform assembly has a base and a hybrid-moving platform. The base has a mounting frame. The hybrid-moving platform is mounted on the base and has a long-stroke moving stage and a piezo-driven micro-stage. The long-stroke moving stage has a benchmark set and a driving device. The piezo-driven micro-stage is connected to the long-stroke moving stage and has a working platform. The measurement feedback assembly is securely mounted on the platform assembly and has a laser interferometer, a reflecting device and a signal-receiving device. The laser-working assembly is mounted on the platform assembly, is electrically connected to the measurement feedback assembly and has a laser direct-writing head, a controlling interface device and a positioning interface device.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
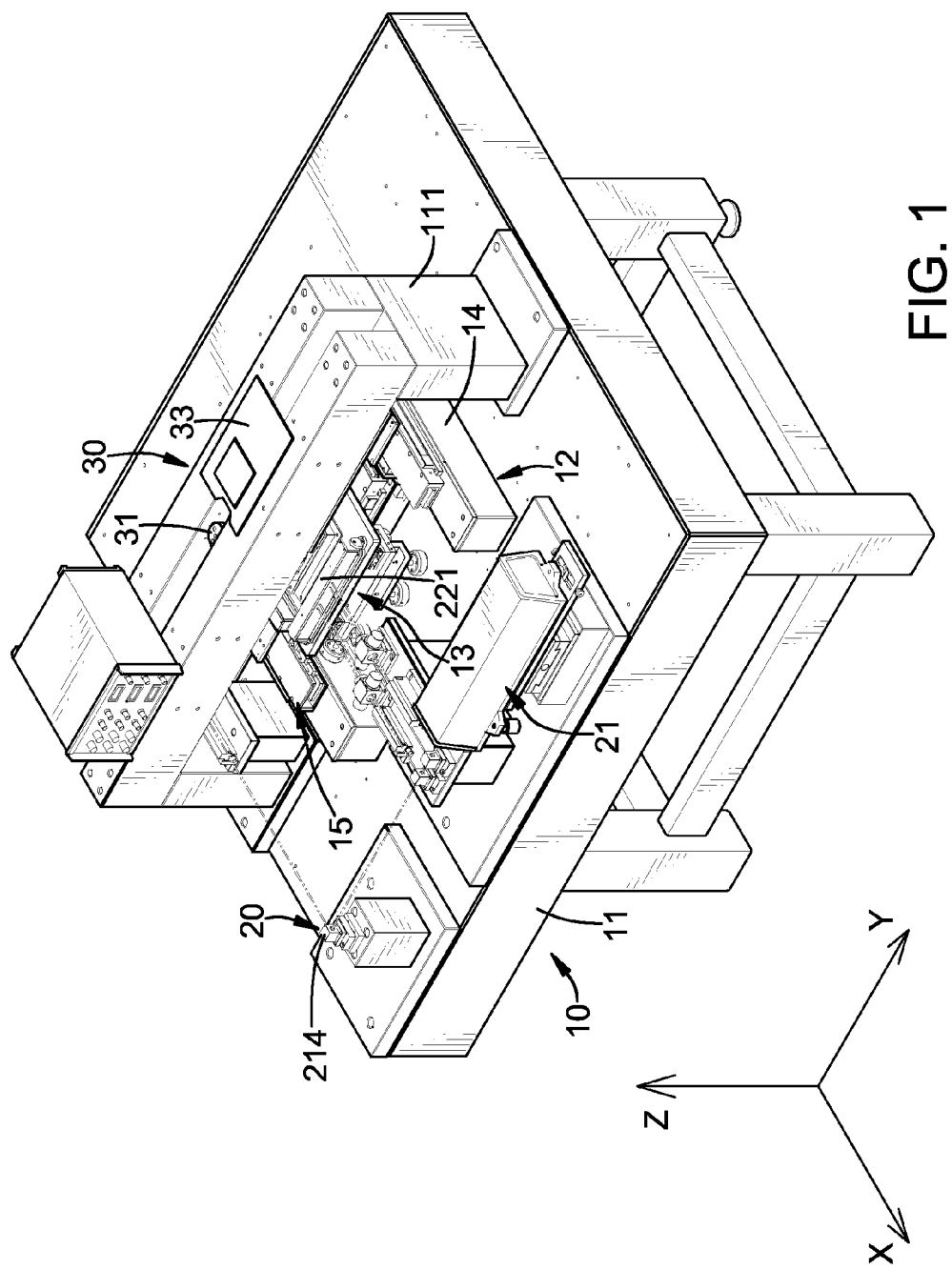
FIG. 1 is a perspective view of a manufacturing-process equipment in accordance with the present invention.

With reference to FIGS. 1 to 4, a manufacturing-process equipment in accordance with the present invention comprises a platform assembly 10, a measurement feedback assembly 20 and a laser-working assembly 30.

The platform assembly 10 has a base 11 and a hybrid-moving platform. The base 11 has a top and a mounting frame 111. The mounting frame 111 may be inversed U-shaped and is mounted on the top of the base 11 at the middle and has a top and a bottom.

The hybrid-moving platform is mounted on the top of the base 11 below the mounting frame 111 and has a long-stroke moving stage 12 and a piezo-driven micro-stage 13.

The long-stroke moving stage 12 is mounted on the top of the base 11 below the mounting frame 111 and has a benchmark set 14 and a driving device 15. The benchmark set 14 is H-shaped, is mounted securely on the top of the base 11 and may be made of granite. The thermal expansion coefficient of granite is low and the grinding precision can reach 2 micrometer/meter. The driving device 15 is mounted on the benchmark set 14 and has multiple linear motors 151. Each linear motor 151 is mounted on the benchmark set 14 and has an upper side, a lower side, multiple stators 152, an active cell 153 and a connecting board 154. The stators 152 are securely mounted on the sides of the linear motor 151 at intervals to form a magnetic leading rail. The linear precision of the magnetic leading rail can reach 0.4 micrometer/200 millimeter. The active cell 153 is movably mounted in the magnetic leading rail of the linear motor 151 between the stators 152 that mounted on the sides of the linear motor 151 and has an outer end extended out of the linear motor 151. The connecting board 154 is connected to the outer end of the active cell 153 and has a connecting side opposite to the active cell 153.

The piezo-driven micro-stage 13 is connected to the long-stroke moving stage 12 and has a loading frame 16, a micro-adjustable device 17, multiple crossing-roller bearing devices 18 and a working platform 19.

Figure 3:
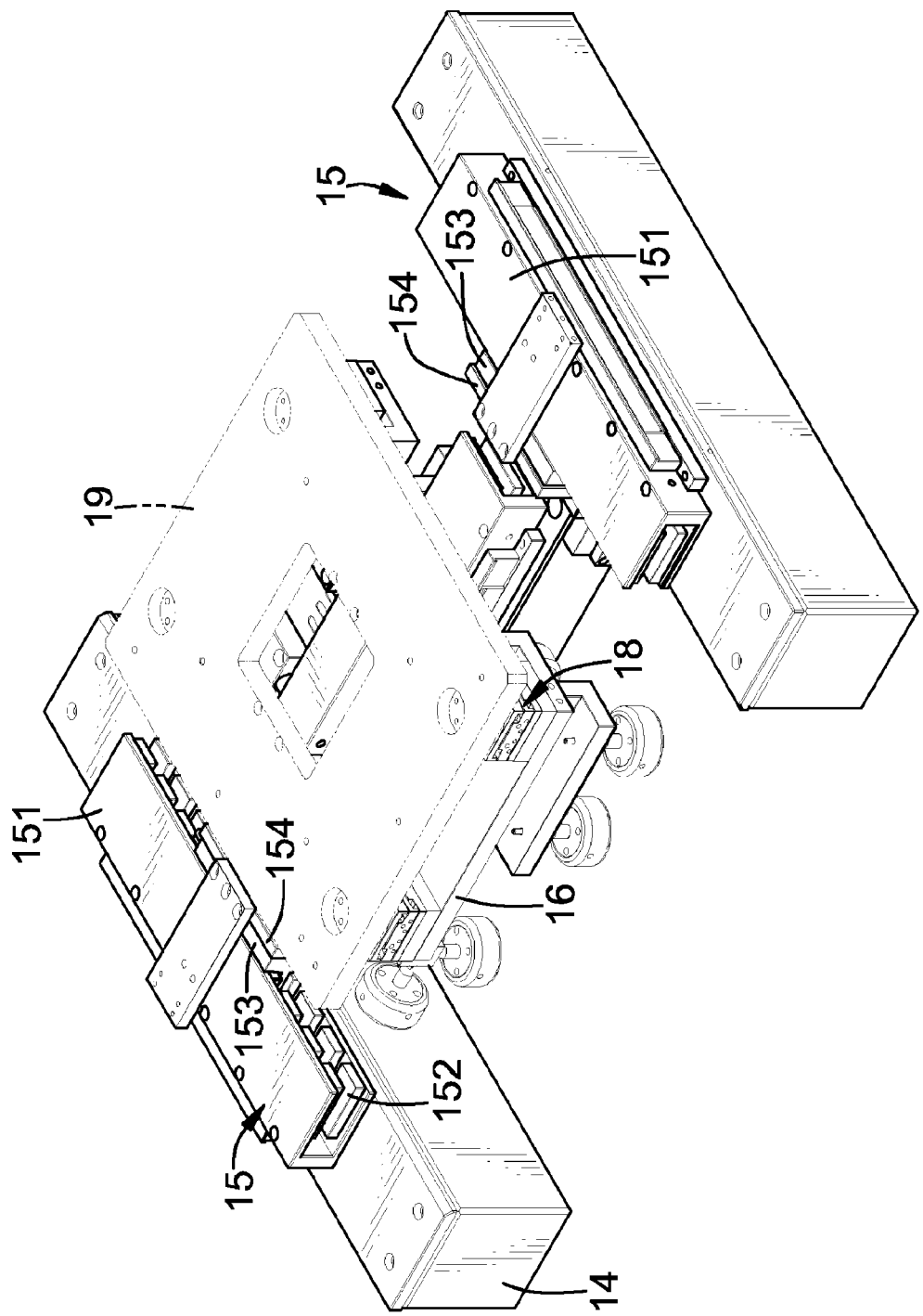
FIG. 3 is an enlarged perspective view of a hybrid-moving platform of a platform assembly of the manufacturing-process equipment in FIG. 1.
Figure 4:
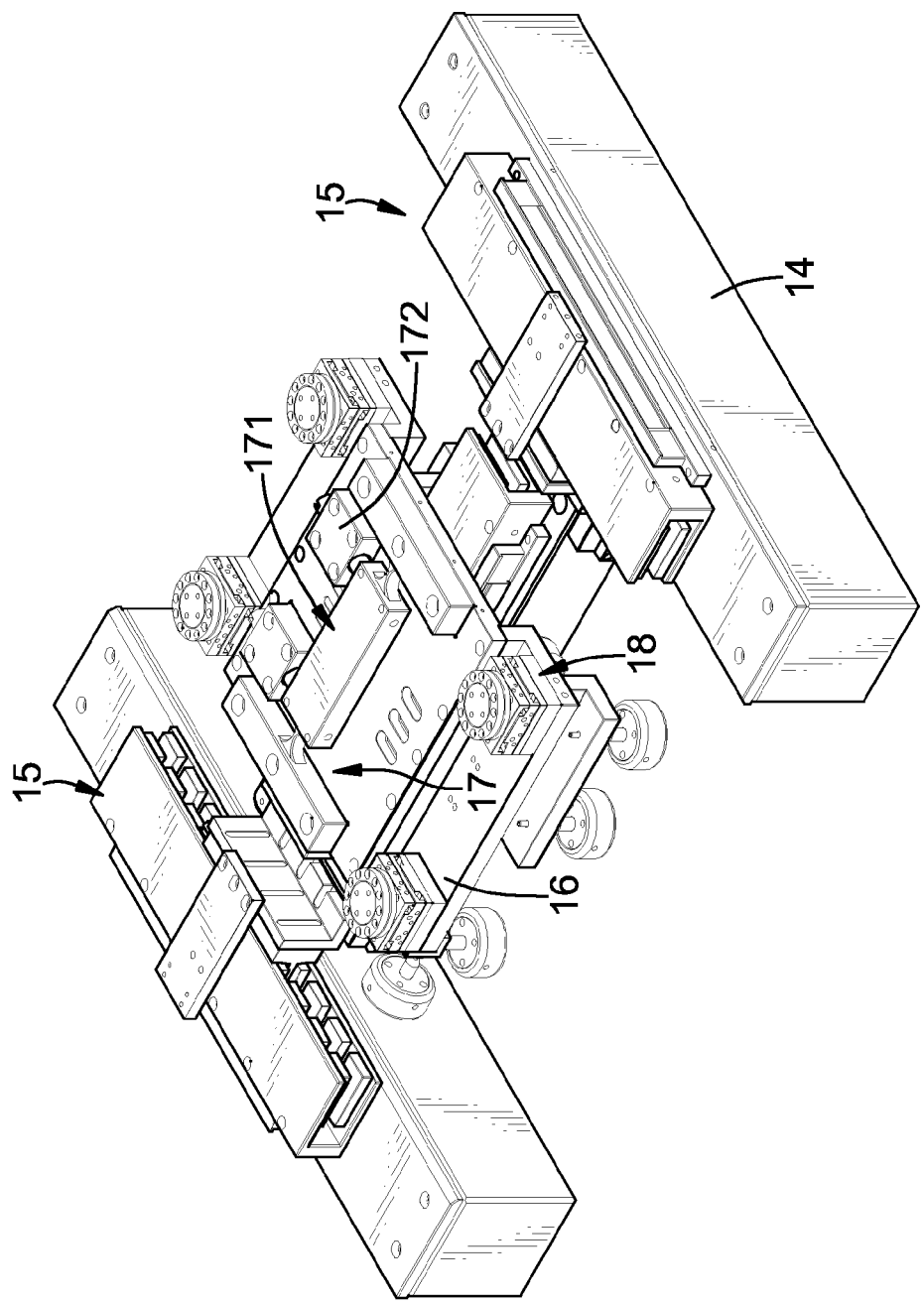
FIG. 4 is an enlarged perspective view of a hybrid-moving platform of a platform assembly of the manufacturing-process equipment in FIG. 1 without a working platform.

The loading frame 16 is connected to the connecting boards 154 of the driving device 15 as shown in FIGS. 3 and 4, can be moved relative to the base 11 along X or Y direction by the long-stroke moving stage 12 and has a top. The micro-adjustable device 17 is mounted on the top of the loading frame 16 and has a flexible seat 171 and multiple piezoelectric actuators 172. The flexible seat 171 is mounted on the top of the loading frame 16 and has a periphery. The piezoelectric actuators 172 are securely mounted on the top of the loading frame 16 and abut the periphery of the flexible seat 171. With reference to FIG. 4, the position of the flexible seat 171 can be adjusted or the flexible seat 171 can be slightly deformed by the pushing force of the piezoelectric actuators 172.

The crossing-roller bearing devices 18 are securely mounted on the top of the loading frame 16 beside the micro-adjustable device 17 and each crossing-roller bearing device 18 can be moved along X and Y directions and has a top end. The working platform 19 is securely mounted on the flexible seat 171 and the top ends of the crossing-roller bearing devices 18 above the lading frame 16 and has a top face.

Figure 5:
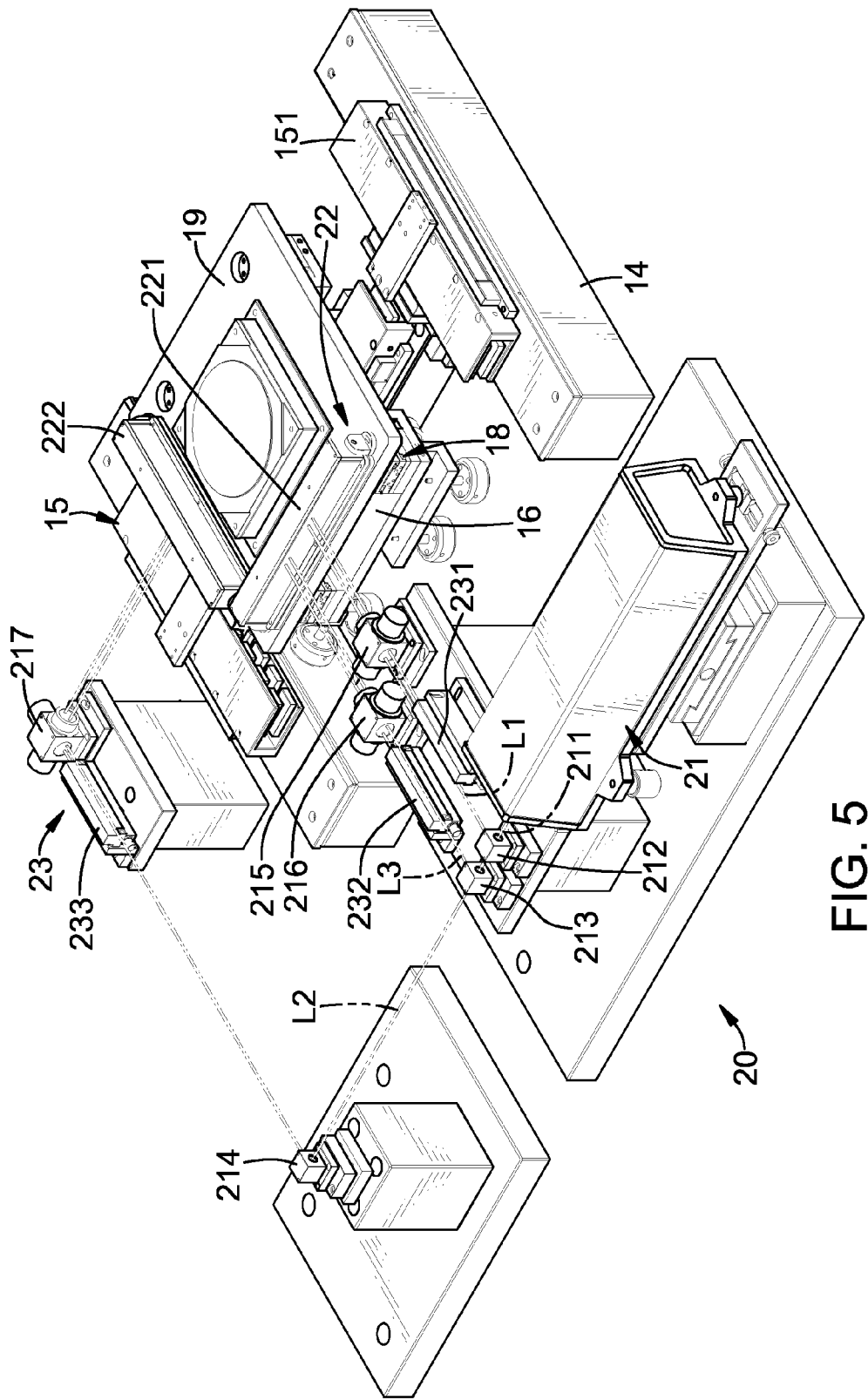
FIG. 5 is an enlarged perspective view of a measurement feedback assembly of the manufacturing-process equipment in FIG. 1.

With reference to FIGS. 1 and 5, the measurement feedback assembly 20 is securely mounted on the platform assembly 10 and has a laser interferometer 21, a reflecting device 22 and a signal-receiving device 23.

The laser interferometer 21 is securely mounted on the top of the base 11 and has a laser beam 211, a first beam splitter 212, a second beam splitter 213, a 90-degree reflecting mirror 214, a first interfere mirror 215, a second interfere mirror 216 and a third interfere mirror 217. The laser beam 211 is emitted from the laser interferometer 21. The beam splitters 212, 213 are securely mounted on the top of the base 11 at an interval and mounted on the emitting path of the laser beam 211. Preferably, the first beam splitter 212 is a 33%-67% spectral-ratio beam splitter and the second beam splitter 213 is a 50%-50% spectral-ratio beam splitter.

The 90-degree reflecting mirror 214 is securely mounted on the top of the base 11, aligns with the beam splitters 212, 213 and is used to change the emitting direction of the laser beam 211 at a right angle. The interfere mirrors 215, 216, 217 are mounted on the top of the base 11 and are used to receive the laser beam 211 that splitted by the beam splitters 212, 213 and reflected by the 90-degree reflecting mirror 214. Preferably, the first interfere mirror 215 is used to receive the laser beam 211 that splitted by the first beam splitter 212, the second interfere mirror 216 is used to receive the laser beam 211 that splitted by the second beam splitter 213 and the third interfere mirror 217 is used to receive the laser beam 211 that reflected by the 90-degree reflecting mirror 214.

The reflecting device 22 is mounted on the working frame 19 and has a first reflecting mirror 221 and a second reflecting mirror 222. The reflecting mirrors 221, 222 are securely mounted on the top face of the working frame 19 at a right angle and are used to reflect the laser beam 211 that passes through the interfere mirrors 215, 216, 217. Preferably, the first reflecting mirror 221 is used to reflect the laser beam 211 that passes through the first interfere mirror 215 and the second interfere mirror 216 and the second reflecting mirror 222 is used to reflect the laser beam 211 that passes through the third interfere mirror 217.

The signal-receiving device 23 is securely mounted on the top of the base 11 and has a first receiver 231, a second receiver 232 and a third receiver 233. The receivers 231, 232, 233 are used to receive the laser beams 211 that reflected by the reflecting mirrors 221, 222 of the receiving device 22. Preferably, the first receiver 231 is used to receive the laser beam 211 that reflected by the first reflecting mirror 221 from the first interfere mirror 215 to detect the X-axis movement of the working platform 19, the second receiver 232 is used to receive the laser beam 211 that reflected by the first reflecting mirror 221 from the second interfere mirror 216 to detect the X-axis movement of the working platform 19 and the third receiver 233 is used to receive the laser beam 211 that reflected by the second reflecting mirror 222 from the third interfere mirror 217 to detect the Y-axis movement of the working platform 19. Furthermore, the X-axis movements that detected by the first receiver 231 and the second receiver 232 can used to calculate the error of the rotating angle ($\theta z$) of the working platform 19.

Figure 2:
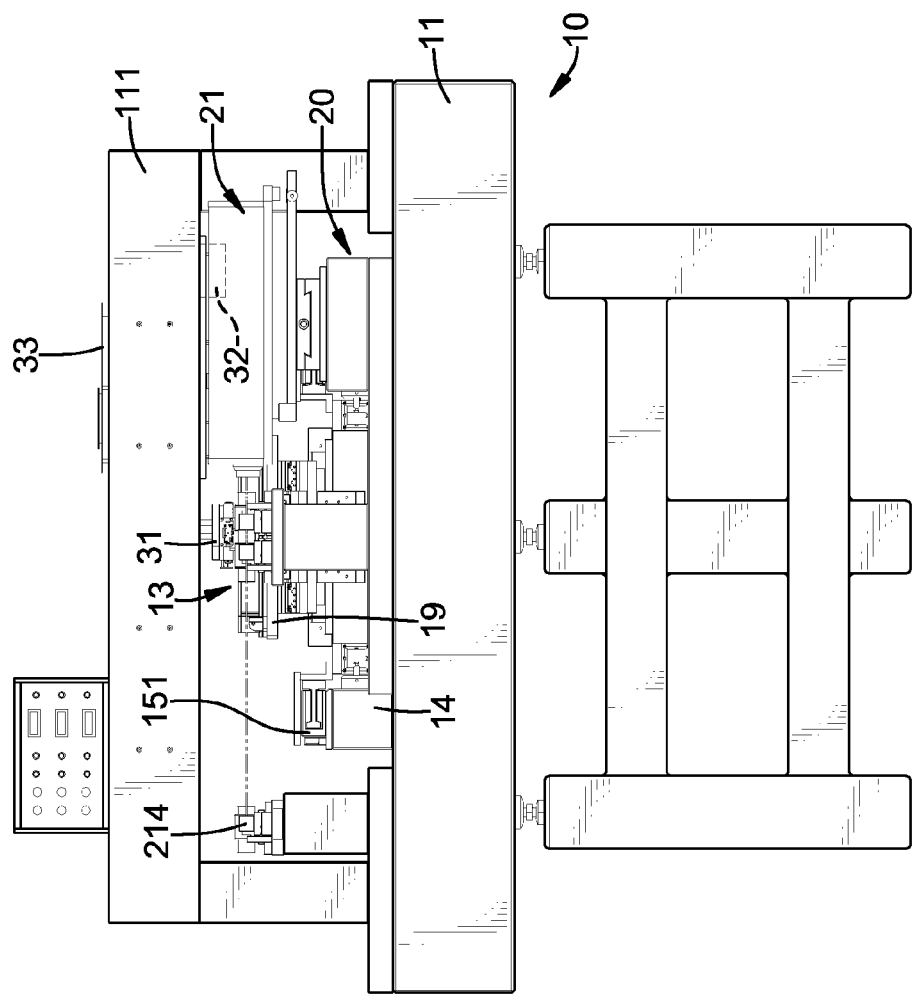
FIG. 2 is a side view of the manufacturing-process equipment in FIG. 1.
Figure 6:
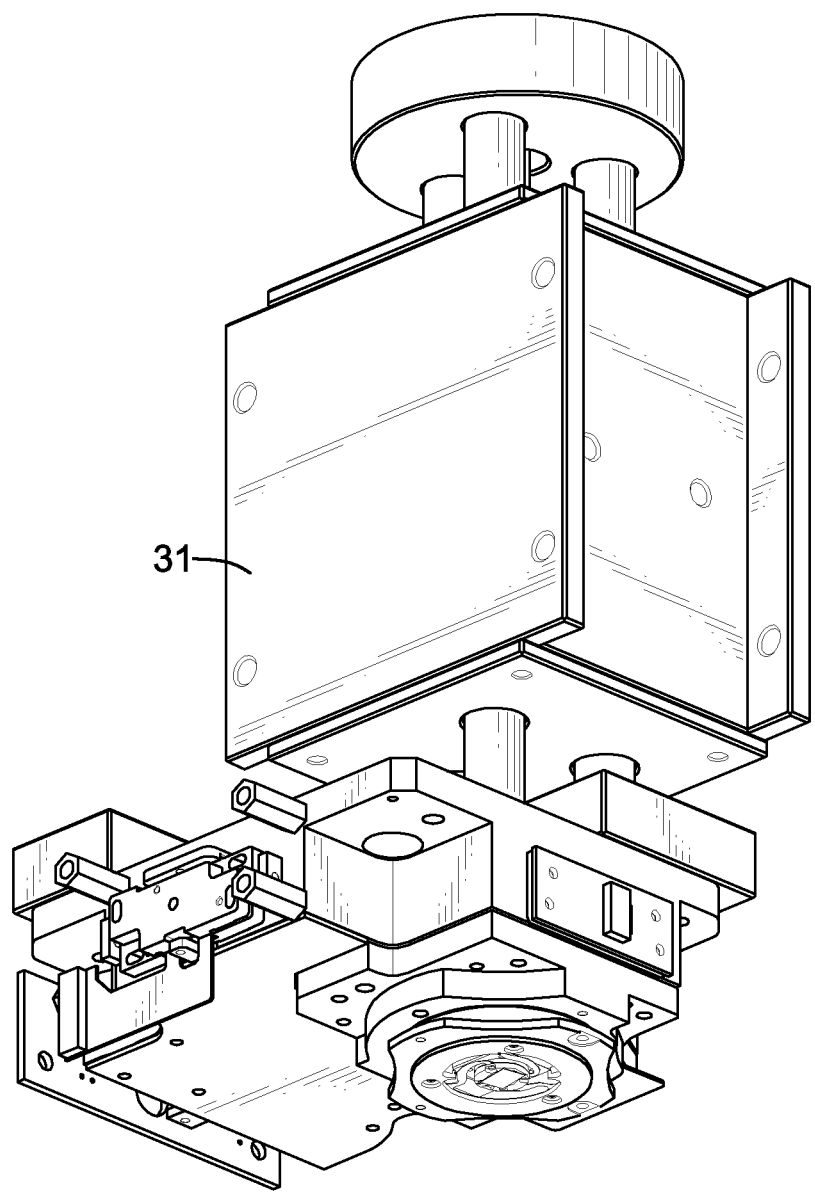
FIG. 6 is an enlarged perspective view of a laser direct-writing head of a laser working assembly of the manufacturing-process equipment in FIG. 1.

With reference to FIGS. 1, 2 and 6, the laser-working assembly 30 is mounted on the platform assembly 10, is electrically connected to the measurement-feedback assembly 20 and has a laser direct-writing head 31, a controlling interface device 32 and a positioning interface device 33. The laser direct-writing head 31 is securely mounted on the mounting frame 111 of the base 11 above the working platform 19. A workpieces can be mounted on the working platform 19 to form nanometer structure pattern in the workpieces by the laser direct-writing head 31. The controlling interface device 32 is securely mounted on the bottom of the mounting frame 111, is electrically connected to the laser direct-writing head 31 and has a software to control the working power and the auto-focusing control of the laser direct-writing head 31. The positioning interface device 33 is mounted on the top of the mounting frame 111 above the controlling interface device 32, is electrically connected to the measurement feedback assembly 20 and the laser direct-writing head 31 and is used to receive the moving signals of the platform assembly 10 that detected by the measurement feedback assembly 20. Preferably, the positioning interface device 33 has a digital integrated circuit chip to compare the desired position of the laser direct-writing head 31 and the movement signal that detected by the measurement feedback assembly 20.

When the manufacturing-process equipment in accordance with the present invention is used to form nanometer structure pattern or nanometer holes in a workpieces, the workpieces is placed on the top face of the working platform 19. Then, with reference to FIGS. 3 and 4, the hybrid-moving platform of the platform assembly 10 is moved by two steps, the first step is moving the long-stroke moving stage 12 in a long distance by the linear motors 151 of the driving device 15. In the present invention, the moving range of the long-stroke moving stage 12 is 200 millimeter×200 millimeter (X, Y). Additionally, the magnetic leading rails of the linear motors 151 can reduce the friction resistance between the stators 152 and the active cells 153 by the magnetic force between the active cells 153 and the stators 152 and this can improve the moving speed and the sensitivity of the long-stroke moving stage 12 and also can increase the useful life of the long-stroke moving stage 12.

After the first step, the second step of the hybrid-moving platform is pushing or pulling the flexible seat 171 moving along the X-axis direction or rotating about the Z-axis direction by the piezoelectric actuators 172. Furthermore, the crossing-roller bearing devices 18 also can be driven to rotate upward or downward about the Z-axis direction and move along X and Y directions with the flexible seat 171. Then, the micro-adjustable device 17 and multiple crossing-roller bearing devices 18 of the piezo-driven micro-stage 13 can allow the working platform 19 accurately moving in a minim distance along the X-axis and rotating a minim angle along the z-axis.

After adjusting the location of working platform 19 of the platform assembly 10 by the micro-adjustable device 17 and the crossing-roller bearing devices 18 of the piezo-driven micro-stage 13, with reference to FIG. 5, the laser beam 211 is emitted from the laser interferometer 21. When the laser beam 211 emits into the first beam splitters 212, the intensity of the laser beam 211 is splitted to from a 33% spectral-ratio laser beam (L1) and a 67% spectral-ratio laser beam. The 33% spectral-ratio laser beam (L1) directly emits to the first interfere mirror 215 and the first reflecting mirror 221, is reflected back to the first interfere mirror 215 by the first reflecting mirror 221 and is received by the first receiver 231 to obtain the X-axis movement of the working platform 19. The 67% spectral-ratio laser beam emits to the second beam splitters 213, the intensity of the 67% spectral-ratio laser beam is splitted to from a 50% spectral-ratio laser beam (L2) and a 50% spectral-ratio laser beam (L3). The 50% spectral-ratio laser beam (L2) emits to and is reflected by the 90-degree reflecting mirror 214 and the third interfere mirror 217, is reflected back to the third interfere mirror 217 by the second reflecting mirror 222 and is received by the third receiver 233 to obtain the Y-axis movement of the working platform 19 同 P7 之問題. The 50% spectral-ratio laser beam (L3) emits to the second interfere mirror 216 and the first reflecting mirror 221, is reflected back to the second interfere mirror 216 by the first reflecting mirror 221 and is received by the second receiver 232 to obtain the X-axis movement of the working platform 19 同 P7 之問題. The X-axis movements of the working platform 19 that received by the first receiver 231 and the second receiver 232 can be used to calculate the error of the rotating angle (θz) of the working platform 19. The laser beam 211 of the laser interferometer 21 can keep in a fine beam at a long distance and will not disperse and this can provide a wavelength with high brightness, stability and accuracy and the interference phenomenon can be easily observed by the laser interferometer 21. Therefore, the measurement feedback assembly 20 can accurately detect the X-axis movement, the Y-axis movement and the error of the rotating angle (θz) of the working platform 19.

When the position of the working platform 19 has been confirmed by the measurement feedback assembly 20, the digital integrated circuit chip of the positioning interface device 33 can be used to compare the desired position of the laser direct-writing head 31 and the actual position of the working platform 19 that detected by the measurement feedback assembly 20. Then, the laser direct-writing head 31 can quickly and accurately form a large range of nanometer structure pattern or nanometer holes in the workpieces.

The manufacturing-process equipment in accordance with the present invention uses two-step operations of the platform assembly 10 to achieve a long-stroke and nanometer-distance effect for the working platform 19. In the first step, the H-shaped long-stroke moving stage 12 can allow the working platform 19 move in 200 millimeter×200 millimeter (X, Y) and allow the laser-working assembly 30 form a large range of nanometer structure pattern or nanometer holes in the workpieces on the working platform 19. In the second step, the piezo-driven micro-stage 13 can allow the working platform 19 move in a minim distance to correct the actual position of the working platform 19 and to allow the positioning precision of the platform assembly 10 achieve the nano-level and to allow the manufacturing-process equipment in accordance with the present invention form nanometer structure pattern or nanometer holes in the workpieces quickly and accurately.

Furthermore, the laser beam 211 of the measurement feedback assembly 20 can keep in a fine beam at a long distance and will not disperse and this can provide a wavelength with high brightness, stability and accuracy and the interference phenomenon can be easily observed by the laser interferometer 21. Therefore, the measurement feedback assembly 20 can accurately detect the X-axis movement, the Y-axis movement and the error of the rotating angle (θz) of the working platform 19. In addition, the positioning interface device 33 of the laser-working assembly 30 can be used to compare the desired position of the laser direct-writing head 31 and the actual position of the working platform 19 that detected by the measurement feedback assembly 20.

Therefore, the manufacturing-process equipment in accordance with the present invention can quickly and accurately form a large range of nanometer structure pattern or nanometer holes in the workpieces and this can reduce the cost of forming nanometer structure pattern in the workpieces to lift the competitive power. Additionally, the platform assembly 10, the measurement feedback assembly 20 and the laser-working assembly 30 of the manufacturing-process equipment in accordance with the present invention can be assembled modularly to reduce the time of maintaining the manufacturing-process equipment.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A manufacturing-process equipment comprising:
a platform assembly having
   a base having
      a top; and
      a mounting frame mounted on the top of the base and having
         a top; and
         a bottom; and
   a hybrid-moving platform mounted on the top of the base below the mounting frame and having
      a long-stroke moving stage mounted on the top of the base below the mounting frame and having
         a benchmark set being H-shaped and mounted securely on the top of the base; and
         a driving device mounted on the benchmark set and having multiple linear motors mounted on the benchmark set, and each liner motor having
            an upper side;
            a lower side;
            multiple stators securely mounted on the sides of the linear motor at intervals to form a magnetic leading rail;
            an active cell movably mounted in the magnetic leading rail of the linear motor between the stators mounted on the sides of the linear motor, and the active cell having an outer end extending out of the linear motor; and
            a connecting board connected to the outer end of the active cell and having a connecting side opposite to the active cell; and
      a piezo-driven micro-stage connected to the long-stroke moving stage and having
         a loading frame connected to the connecting boards of the driving device and having a top;
         a micro-adjustable device mounted on the top of the loading frame and having a flexible seat mounted on the top of the loading frame and having a periphery; and multiple piezoelectric actuators securely mounted on the top of the loading frame and abutting the periphery of the flexible seat;

multiple crossing-roller bearing devices securely mounted on the top of the loading frame beside the micro-adjustable device and each crossing-roller bearing device having a top end; and a working platform securely mounted on the flexible seat and the top ends of the crossing-roller bearing devices above the loading frame and having a top face;

a measurement feedback assembly securely mounted on the platform assembly and having a laser interferometer securely mounted on the top of the base to emit a laser beam;

a reflecting device mounted on the top face of the working platform; and a signal-receiving device securely mounted on the top of the base and receiving the laser beam reflected by the signal-receiving device; and a laser-working assembly mounted on the platform assembly, electrically connected to the measurement feedback assembly and having a laser direct-writing head securely mounted on the mounting frame of the base above the working platform;

a controlling interface device securely mounted on the bottom of the mounting frame, electrically connected to the laser direct-writing head to control working power and auto-focusing of the laser direct-writing head; and a positioning interface device mounted on the top of the mounting frame above the controlling interface device, electrically connected to the measurement feedback assembly and the laser direct-writing head to receive movement signals of the platform assembly detected by the measurement feedback assembly to compare a desired position of the laser direct-writing head and the movement signals detected by the measurement feedback assembly.

2. The manufacturing-process equipment as claimed in claim 1, wherein the laser interferometer has a first beam splitter securely mounted on the top of the base and mounted on an emitting path of the laser beam;

a second beam splitter securely mounted on the top of the base near the first beam splitter and mounted on the emitting path of the laser beam;

a 90-degree reflecting mirror securely mounted on the top of the base and aligning with the beam splitters to change an emitting direction of the laser beam at a right angle;

a first interference mirror mounted on the top of the base to receive the laser beam split by the first beam splitter;

a second interference mirror mounted on the top of the base to receive the laser beam split by the second beam splitter; and a third interference mirror mounted on the top of the base to receive the laser beam reflected by the 90-degree reflecting mirror.

3. The manufacturing-process equipment as claimed in claim 2, wherein the reflecting device has a first reflecting mirror securely mounted on the top face of the working platform to reflect the laser beam emitted by the first interference mirror and the second interference mirror; and a second reflecting mirror securely mounted on the top face of the working platform at a right angle with the first reflecting mirror to reflect the laser beam emitted by the third interference mirror.

4. The manufacturing-process equipment as claimed in claim 3, wherein the signal-receiving device has a first receiver securely mounted on the top of the base to receive the laser beam reflected by the first reflecting mirror from the first interference mirror;

a second receiver securely mounted on the top of the base to receive the laser beam reflected by the first reflecting mirror from the second interference mirror; and a third receiver securely mounted on the top of the base to receive the laser beam that reflected by the second reflecting mirror from the third interference mirror.

5. The manufacturing-process equipment as claimed in claim 2, wherein the reflecting device has a first reflecting mirror securely mounted on the top face of the working platform to reflect the laser beam emitted by the first interference mirror and the second interference mirror; and a second reflecting mirror securely mounted on the top face of the working platform at a right angle with the first reflecting mirror to reflect the laser beam emitted by the third interference mirror.

6. The manufacturing-process equipment as claimed in claim 5, wherein the signal-receiving device has a first receiver securely mounted on the top of the base to receive the laser beam reflected by the first reflecting mirror from the first interference mirror;

a second receiver securely mounted on the top of the base to receive the laser beam reflected by the first reflecting mirror from the second interference mirror; and a third receiver securely mounted on the top of the base to receive the laser beam reflected by the second reflecting mirror from the third interference mirror.

* * * * *